United States Patent [19]

Shreve

[11] Patent Number: 5,170,071
[45] Date of Patent: Dec. 8, 1992

[54] STOCHASTIC ARTIFICAL NEURON WITH MULTILAYER TRAINING CAPABILITY

[75] Inventor: Gregory A. Shreve, Redondo Beach, Calif.

[73] Assignee: TRW Inc., Redondo Beach, Calif.

[21] Appl. No.: 716,717

[22] Filed: Jun. 17, 1991

[51] Int. Cl.$^5$ ............................................. G06F 15/18
[52] U.S. Cl. .......................................... 307/20; 395/27
[58] Field of Search .......................... 395/27; 307/201

[56] References Cited

U.S. PATENT DOCUMENTS

| | | | |
|---|---|---|---|
| 3,341,823 | 9/1967 | Connelly | 307/201 X |
| 3,691,400 | 9/1972 | Askew | 307/201 |
| 3,950,733 | 4/1976 | Cooper et al. | 340/172.5 |
| 4,518,866 | 5/1985 | Clymer | 307/201 |
| 4,591,980 | 5/1986 | Huberman et al. | 364/200 |
| 4,773,024 | 9/1988 | Faggin et al. | 364/513 |
| 4,807,168 | 2/1989 | Moopenn et al. | 364/602 |
| 4,809,193 | 2/1989 | Jourjine | 364/513 |
| 4,893,255 | 1/1990 | Tomlinson | 364/513 |
| 4,918,618 | 4/1990 | Tomlinson | 364/513 |
| 4,989,256 | 1/1991 | Buckley | 395/27 X |

OTHER PUBLICATIONS

Tomlinson, Jr., Walker and Sivilotti, "A Digital Neural Network Architecture for VLSI", IJCNN 1990, Jun. 1990, San Diego, Calif.
Walker and Tomlinson, Jr., "DNNA: A Digital Neural Network Architecture", INNC, Jul. 9-13, 1990.
P. C. Patton, "The Neural Semiconductor NU32-/SU3232 Chip Set," the Superperformance Computing Service Brief No. 36, Feb. 1990.
R. Colin Johnson, "Digital Neurons Mimic Analog," Electronic Engineering Times, Feb. 12, 1990.
Nguyen, Dziem and Holt, Fred, "Stochastic Processing in a Neural Network Application," IEEE First International Conference on Neural Networks, San Diego Calif., Jun. 21-24, 1987, pp. 281-291.
Gaines, Brian R., "Uncertainty as a Foundation of Computational Power in Neural Neworks," IEEE First International Conference on Neural Networks, San Diego Calif., Jun. 21-24, 1987, pp. 51-57.
Van den Bout, David E. and Miller, T. K., "A Stochastic Architecture for Neural Nets," pp. 481-488.
Rumelhart, David E. et al., "Learning Representations by Back-Propagating Errors," Nature, vol. 323, Oct. 9, 1986, pp. 533-536.
Rumelhart, David E. et al., "Learning Internal Representations by Error Propagation," Institute for Cognitive Science (ICS) Report 8506, Sep. 1985.

*Primary Examiner*—David Hudspeth
*Attorney, Agent, or Firm*—James M. Steinberger; G. Gregory Schivley; Ronald L. Taylor

[57] ABSTRACT

A probabilistic or stochastic artificial neuron in which the inputs and synaptic weights are represented as probabilistic or stochastic functions of time, thus providing efficient implementations of the synapses. Stochastic processing removes both the time criticality and the discrete symbol nature of traditional digital processing, while retaining the basic digital processing technology. This provides large gains in relaxed timing design constraints and fault tolerance, while the simplicity of stochastic arithmetic allows for the fabrication of very high densities of neurons. The synaptic weights are individually controlled by a backward error propagation which provides the capability to train multiple layers of neurons in a neural network.

8 Claims, 3 Drawing Sheets

STOCHASTIC ARTIFICAL NEURON WITH MULTILAYER TRAINING CAPABILITY

BACKGROUND OF THE INVENTION

This invention relates generally to artificial neurons for simulating the functions of biological neurons and, more particularly, to stochastic or probabilistic artificial neurons.

Artificial neurons and neural networks have been extensively studied in an attempt to accurately simulate the various functions of the human brain. The human brain employs trillions of interconnected nerve cells, or neurons, to perform its various functions, such as memory, learning and pattern recognition. A neuron receives stimuli, in the form of electrical input pulses, from other neurons or receptor sense organs, such as the eyes and ears. The neuron receives the stimuli through its synapses, which can be either excitory or inhibitory. Excitory synapses bring the neuron closer to firing, while inhibitory synapses prevent the neuron from firing. The firing of the neuron generates electrical output pulses with varying pulse repetition rates, which provide stimuli to other neurons or control effector organs, such as the muscles.

A typical artificial neuron of the prior art includes, in series, a plurality of weighted inputs, or synapses, an adder, and a soft saturation or sigmoid function. The weighted inputs are summed together in the adder and limited by the saturation function to provide a nonlinear weighted sum function of the inputs. Each weighted input or synapse generates a potential which varies in magnitude and is either positive or negative in sign depending on whether the synapse is excitory or inhibitory. Large numbers of these artificial neurons are then interconnected in a large array to form a neural network.

An artificial neural network must exhibit the ability to learn if it is to properly simulate the human brain. Biological neurons learn through a variation in the strength of their intersynaptic connections which alters the manner in which they react to stimuli. An artificial neural network learns in the same manner, by a variation in the input or synaptic weightings of the artificial neurons. In order to train an artificial neural network, an input signal is applied to the network and the actual output response is compared with the desired output response. The difference or error between the two responses is applied to a training algorithm which modifies the synaptic weightings until the actual output response converges with the desired output response. This convergence process is repeated for different input signals until the neural network is able to recognize the various input signals.

Artificial neurons can be implemented using either analog or digital circuits. Analog circuits have the potential for high densities and fast operation, but are susceptible to performance degradation due to noise and temperature changes. Multiple functionally-identical analog circuits are also difficult to fabricate. Digital integrated circuits are easily manufactured and are functionally identical. However, multiplication and addition of fixed-format digital values requires excessive amounts of circuitry. Accordingly, there has been a need for a more efficient digital implementation of an artificial neuron, especially for such applications as providing target recognition for missiles and star recognition for satellite navigation. The present invention clearly fulfills this need.

SUMMARY OF THE INVENTION

The present invention resides in a probabilistic or stochastic artificial neuron having one or more excitory AND gates, an OR gate for summing the outputs of the excitory AND gates, one or more inhibitory AND gates, an OR gate for summing the outputs of the inhibitory AND gates, and an AND gate for summing the outputs of the excitory and inhibitory OR gates. A plurality of inputs $I_1, I_2, I_3 \ldots I_N$ are applied to the excitory AND gates and a plurality of inputs $I, I_2, I_3 \ldots I_N$ are applied to the inhibitory AND gates. A plurality of variable weighting elements $G_1, G_2, G_3 \ldots G_N$ modify a pseudorandom number sequence and provide the other input for the excitory and inhibitory AND gates. The variable gain of each weighting element is individually controlled by a backward error propagation training algorithm which conditions the neuron to respond to a particular input signal with a desired output response. The advantage of using backward error propagation for training the neuron is the ability to train multiple layers of neurons in a neural network.

The stochastic artificial neuron of the present invention represents the inputs and synaptic weights as probabilistic or stochastic functions of time, thus providing efficient implementations of the synapses. Stochastic processing uses simple binary signals which randomly assume either the value 0 or 1. The mean value of a stochastic signal can be viewed as an analog signal in the range from 0 to 1. This mean value is represented by the signal's duty cycle, which is the number of 0's and 1's over some unit of time. Therefore, measurement of the actual neural response requires observation of a neuron's output over a period of time. However, the duty cycle format removes both the time criticality and the discrete symbol nature of traditional digital processing, while retaining the basic digital processing technology. This provides large gains in relaxed timing design constraints and fault tolerance, while the simplicity of stochastic arithmetic allows for the fabrication of very high densities of neurons.

The stochastic weight multipliers in the artificial neuron of the present invention are simple AND gates. This is the element of the stochastic artificial neuron that is most responsible for weight, size and power savings when compared with conventional fixed or floating point digital multiplications. The neuron inputs $I_1, I_2, I_3 \ldots I_N$ are represented by firing frequencies and the function of the weighting element is to modify this frequency. By representing a weight as a stochastic pulse train with probability $P(B) = G$ and the neuron input with probability $P(A) = I$, synaptic multiplication $P(A)*P(B) = G*I$ is obtained by an AND gate.

The summation and sigmoid functions are combined in the stochastic artificial neuron of the present invention by the excitory and inhibitory OR gates. The OR gates provide a linear sum function for very low duty cycle inputs and a 100% duty cycle or saturated output for very high duty cycle inputs. Therefore, the excitory OR gate generates one half of the sigmoid function and the inhibitory OR gate, after its output is inverted in an inverter, generates the other half. The advantage of combining the summation and nonlinear soft saturation functions in one circuit element is that representing potentially unbounded sums of synaptic inputs prior to application of the nonlinear saturation function is avoided.

It will be appreciated from the foregoing that the present invention represents a significant advance in the field of artificial neurons and neural networks. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
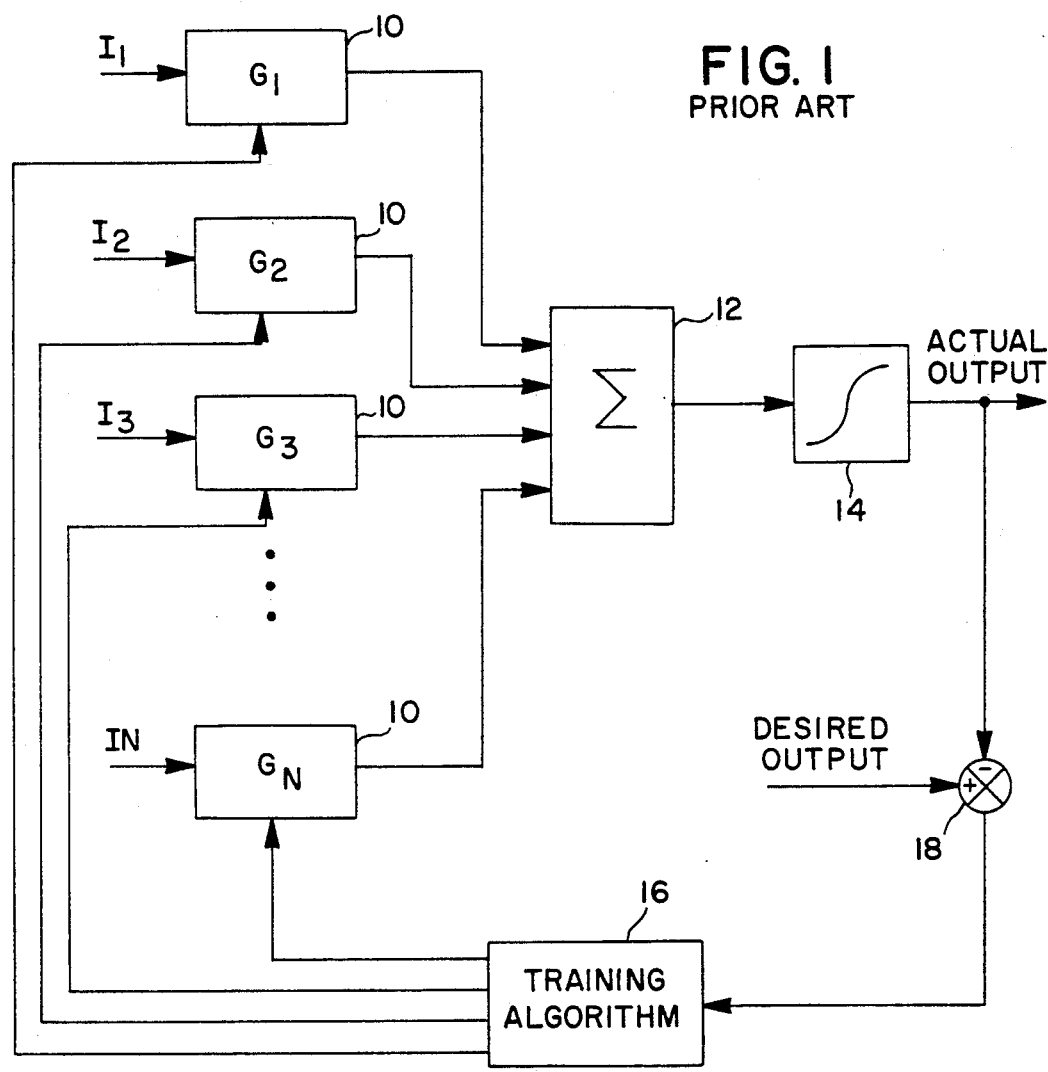
FIG. 1 is a block diagram of artificial neuron of the prior art.

As illustrated in FIG. 1, a prior art artificial neuron includes a plurality of inputs $I_1, I_2, I_3 \ldots I_N$ which are applied to a plurality of variable weighting elements 10, designated $G_1, G_2, G_3 \ldots G_N$, respectively. These variable weighting elements 10 are variable gains and represent the synapses of the neuron. The gain is positive if the synapse is excitory and negative if the synapse is inhibitory. The outputs of the weighting elements 10 are applied to an adder 12 and then to a soft saturation or sigmoid function 14 to produce a single output in proportion to the sum of the weighting element outputs. The sigmoid function causes the output level to saturate at zero for mostly inhibitory inputs and saturate at the maximum output for mostly excitory inputs. The output is linear for small excitory or inhibitory inputs.

The variable gain of each weighting element 10 is individually controlled by a training algorithm 16 which conditions the neuron to respond to a particular input signal with a desired output response. To train the neuron, a particular input signal is repetitively applied to the inputs $I_1, I_2, I_3 \ldots I_N$. After each application of the input signal, the actual output response is compared to a desired output response by a subtractor 18. The difference or error between the two responses is applied to the training algorithm 16 to modify the gains of the individual weighting elements 10 until the actual output response converges with the desired output response. This convergence process is repeated for different input signals until the neuron is able to recognize the various input signals.

Figure 2:
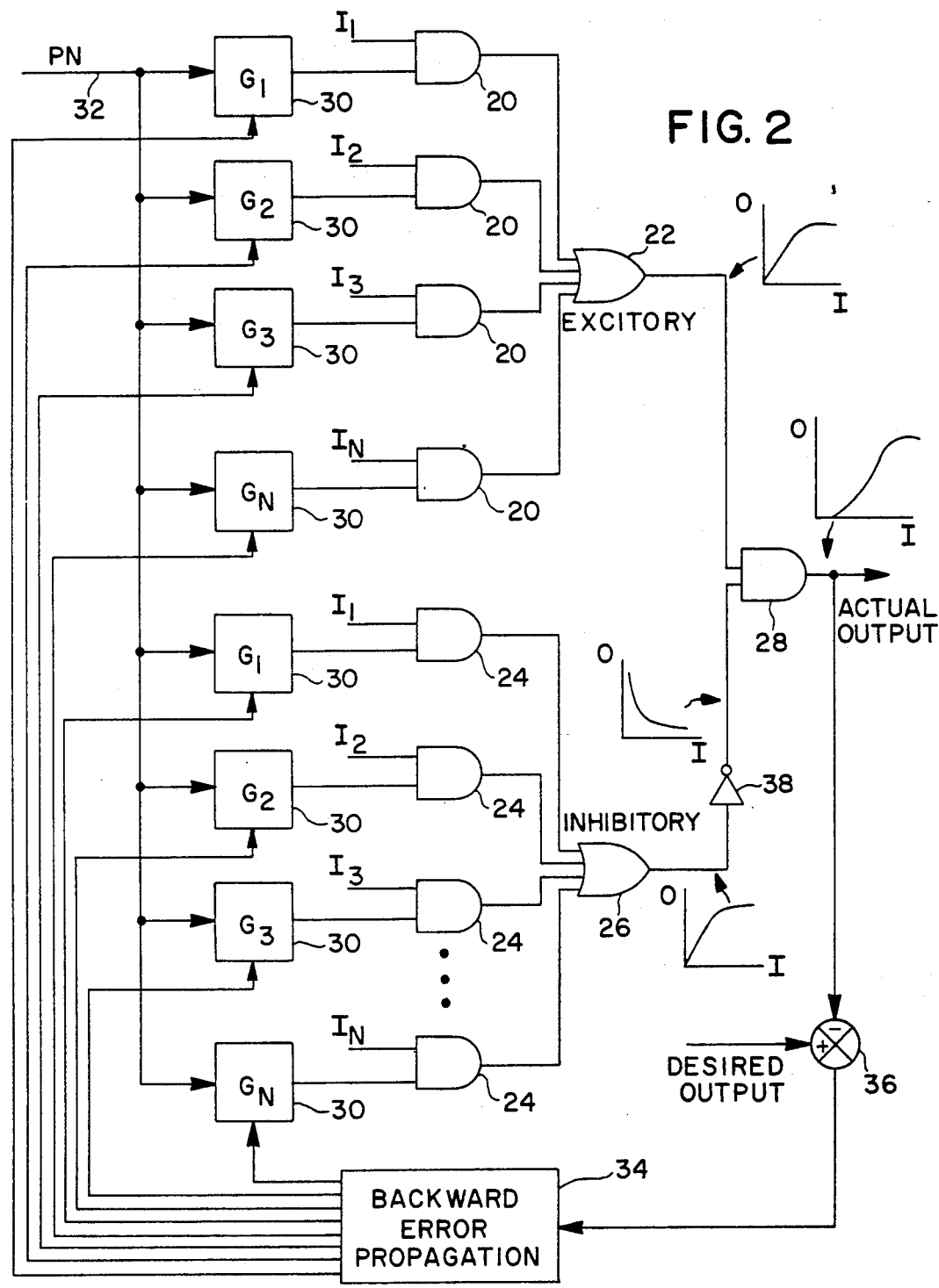
FIG. 2 is a block diagram of a stochastic artificial neuron in accordance with the present invention.

As illustrated in FIG. 2, a probabilistic or stochastic artificial neuron in accordance with the present invention includes one or more excitory AND gates 20, an OR gate 22 for summing the outputs of the excitory AND gates 20, one or more inhibitory AND gates 24, an OR gate 26 for summing the outputs of the inhibitory AND gates 24, and an AND gate 28 for summing the outputs of the excitory and inhibitory OR gates 22, 26. A plurality of inputs $I_1, I_2, I_3 \ldots I_N$ are applied to the excitory AND gates 20 and a plurality of inputs $I_1, I_2, I_3 \ldots I_N$ are applied to the inhibitory AND gates 24. A plurality of variable weighting elements 30, identified as $G_1, G_2, G_3 \ldots G_N$, modify a pseudorandom number sequence, on line 32, and provide the other input for the excitory and inhibitory AND gates 20, 24. The variable gain of each weighting element 30 is individually controlled by a backward error propagation training algorithm 34 which conditions the neuron to respond to a particular input signal with a desired output response. The actual output response is compared to a desired output response by a subtractor 36. The advantage of using backward error propagation for training the neuron is the ability to train multiple layers of neurons in a neural network.

The stochastic artificial neuron of the present invention represents the inputs and synaptic weights as probabilistic or stochastic functions of time, thus providing efficient implementations of the synapses. Stochastic processing uses simple binary signals which randomly assume either the value 0 or 1. The mean value of a stochastic signal can be viewed as an analog signal in the range from 0 to 1. This mean value is represented by the signal's duty cycle, which is the number of 0's and 1's over some unit of time. Therefore, measurement of the actual neural response requires observation of a neuron's output over a period of time. However, the duty cycle format removes both the time criticality and the discrete symbol nature of traditional digital processing, while retaining the basic digital processing technology. This provides large gains in relaxed timing design constraints and fault tolerance, while the simplicity of stochastic arithmetic allows for the fabrication of very high densities of neurons.

The stochastic weight multipliers in the artificial neuron of the present invention are simple AND gates 20, 24. This is the element of the stochastic artificial neuron that is most responsible for weight, size and power savings when compared with conventional fixed or floating point digital multiplications. The neuron inputs $I_1, I_2, I_3 \ldots I_N$ are represented by firing frequencies and the function of the weighting element 30 is to modify this frequency. By representing a weight as a stochastic pulse train with probability $P(B)=G$ and the neuron input with probability $P(A)=I$, synaptic multiplication $P(A)*P(B)=G*I$ is obtained by an AND gate.

The summation and sigmoid functions are combined in the stochastic artificial neuron of the present invention by the excitory and inhibitory OR gates 22, 26. The OR gates 22, 26 provide a linear sum function for very low duty cycle inputs and a 100% duty cycle or saturated output for very high duty cycle inputs. Therefore, the excitory OR gate 22 generates one half of the sigmoid function and the inhibitory OR gate 26, after its output is inverted in an inverter 38, generates the other half. The advantage of combining the summation and nonlinear soft saturation functions in one circuit element is that representing potentially unbounded sums of synaptic inputs prior to application of the nonlinear saturation function is avoided.

Figure 3:
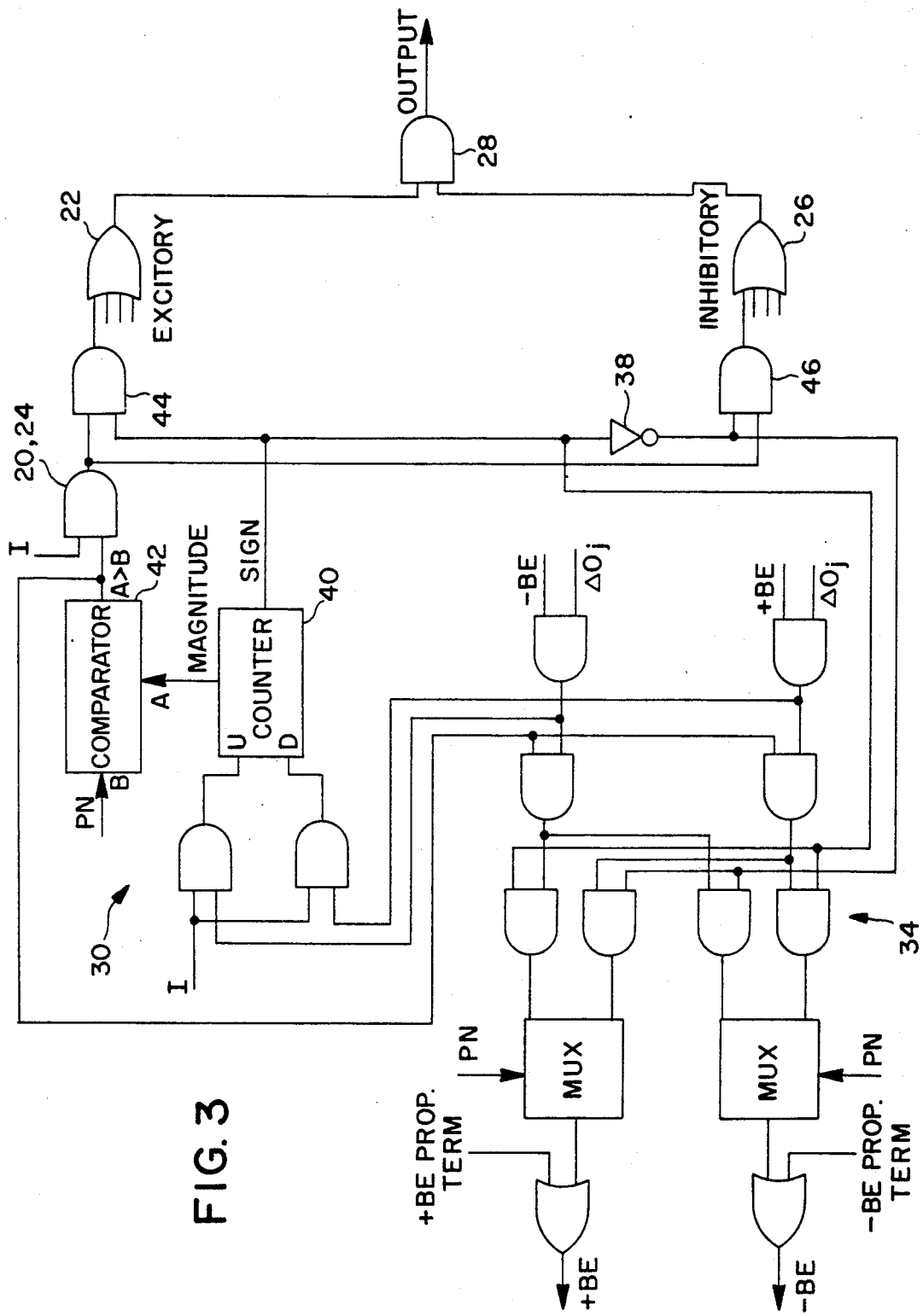
FIG. 3 is a block diagram of an individual synapse of the stochastic artificial neuron of the present invention.

As illustrated in FIG. 3, a single weighting element 30 ($G_1, G_2, G_3 \ldots G_N$) includes an up-down counter 40, a binary-coded digital comparator 42 and AND gates 44, 46. The variable gain is stored in the up-down counter 40 with a sign bit, which allows the synapse to be used as either an excitory or inhibitory synapse. The sign bit is applied to the two AND gates 44, 46, thus allowing the output of excitory AND gate 20 to be applied to the excitory OR gate 22 if the sign bit is positive and the output of inhibitory AND gate 24 to be applied to the inhibitory OR gate 26 if the sign bit is negative. The counter 40 increments or decrements as a function of the up and down control inputs, which are driven by the backward error signals. The variable gain adjusts the frequency of a pseudorandom number sequence applied to the comparator 42. The output of the comparator is ANDed with the input I in the AND gate 20 or 24.

Backward error propagation, as described in a paper by Rumelhart, David E. et al., "Learning Internal Representations by Error Propagation," Institute for Cognitive Science (ICS) Report 8506, September 1985, is used for training the weights of the artificial neuron of the present invention. Backward error propagation requires only local, immediately available information for calculating the weight deltas. The method uses a multidimensional gradient descent with a generalized delta rule. The delta rule states that the change in a weight value during training is proportional to the product of several terms resulting from the partial derivative of the output error with respect to the weight being trained. This equation is $$\Delta W_{ij} = \delta * I_i * \eta_j$$

where $$\delta_j = \Delta O_j * \Sigma_k (\delta_k * W_{jk}).$$

The variable is the training weight, $I_i$ is the input corresponding to the weight $W_{ij}$ being adjusted, $\Delta O_j$ is the derivative of the $O_j$ neuron output, the summation term is the recursive backward error propagating term, and i, j and k represent successive layers of neurons. The two multiplier terms are implemented with AND gates and the backward error summations are implemented with OR gates. The OR gate provides an additional sigmoid or saturation function in addition to the summation. The derivative term $\Delta O_j$ can be computed using an exclusive OR function with inputs of $O_j$ and a one sample delayed value of $O_j$.

From the foregoing, it will be appreciated that the present invention represents a significant advance in the field of artificial neurons and neural networks. Although a preferred embodiment of the invention has been shown and described, it will be apparent that other adaptations and modifications can be made without departing from the spirit and scope of the invention. Accordingly, the invention is not to be limited, except as by the following claims.

I claim:

1. A stochastic artificial neuron comprising:
   weight multiplier means producing a weight multiplier signal;
   a plurality of excitory AND gates, each AND gate having as inputs a stochastic input signal and a stochastic weight multiplier signal;
   a first OR gate for summing the outputs of the excitory AND gates;
   a plurality of inhibitory AND gates, each AND gate having as inputs a stochastic input signal and a stochastic weight multiplier signal;
   a second OR gate for summing the output of the inhibitory AND gates;
   an output AND gate for summing the output of the two OR gate; and
   training algorithm circuit means responsive to the output AND gate and operative to provide an error signal to said weight mulitplier means, wherein said error signal causes said weight multiplier to modify said weight multiplier signal.

2. The stochastic artificial neuron as set forth in claim 1, wherein the weight multiplier modifies the frequency of a pseudorandom number sequence and applies the modified sequence to the excitory and inhibiting AND gates.

3. The stochastic artificial neuron as set forth in claim 1, wherein said training algorithm produces an error signal in accordance with the backward error propagation algorithm.

4. The stochastic artificial neuron as set forth in claim 1, wherein said weight multiplier means includes a means for producing a sign signal representing the sign of the weight signal, and means for directing the stochastic input to the excitory AND gate or the inhibitory AND gate depending on the sign signal.

5. The stochastic artificial neuron as set forth in claim 1, wherein each weight multiplier means includes an up-down counter and a binary-coded digital comparator, the counter incrementing or decrementing as a function of up and down control inputs driven by said training algorithm circuit means.

6. The stochastic artificial neuron as set forth in claim 5, wherein said training algorithm circuit utilizes the backward error propagation algorithm.

7. A stochastic artificial neuron, comprising:
   a plurality of excitory AND gates, each AND gate having an input and a weight multiplier;
   a first OR gate for summing the output of the excitory AND gates;
   a plurality of inhibitory AND gates, each AND gate having an input and a weight multiplier;
   a second OR gate for summing the output of the inhibitory AND gates; and
   an output AND gate for summing the output of the two OR gates,
   wherein said weight multipliers are varied during training with backward error propagation and wherein each weight multiplier includes an up-down counter and a binary-coded digital comparator, two counter incrementing of decrementing as a function of up and down control inputs driven by the backward error propagation signals.

8. A stochastic artificial neuron, comprising:
   weight multiplier means producing a weight multiplier signal;
   a plurality of excitory AND gates, each AND gate having as inputs a stochastic input signal and a stochastic weight multiplier signal;
   a first OR gate for summing the outputs of the excitory AND gates;
   a plurality of inhibitory AND gates, and each AND gate having as inputs a stochastic input signal an da stochastic weight multiplier signal;
   a second OR gate for summing the output of the inhibitory AND gates;
   an output AND gate for summing the output of the two OR gates;
   training algorithm circuit means responsive to the output AND gate and operative to provide an error signal to said weight multiplier means, wherein said error signal causes said weight multiplier to modify said weight multiplier signal;
   said weight multiplier means including an up-down counter and a binary-coded digital comparator, the counter incrementing or decrementing as a function of up and down control inputs driven by said training algorithm circuit means, whereby said counter is used as a memory element for weight values; and
   wherein the weight multiplier means modifies the frequency of a pseudorandom number sequence and applies the modified sequence to the excitory and inhibitory AND gates.

* * * * *